INVENTOR.
WAYNE ALLMAN DOWNEY

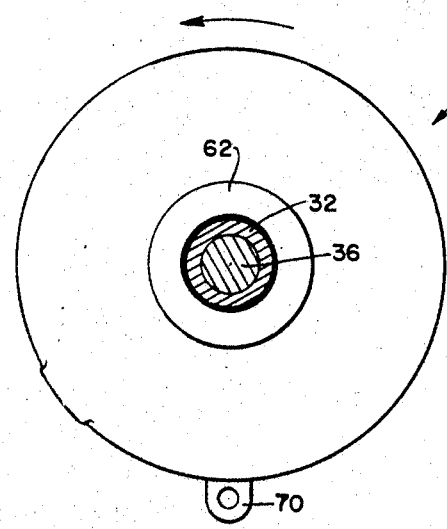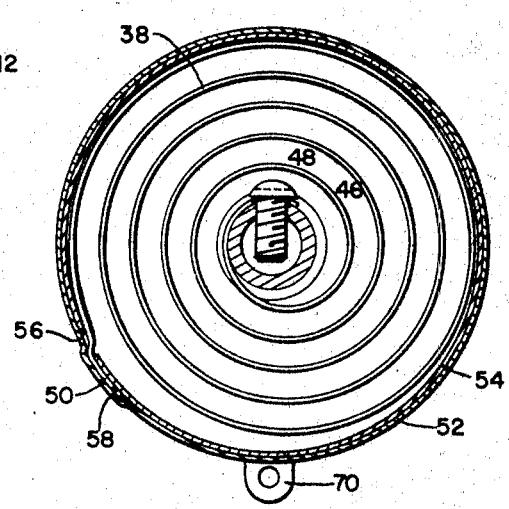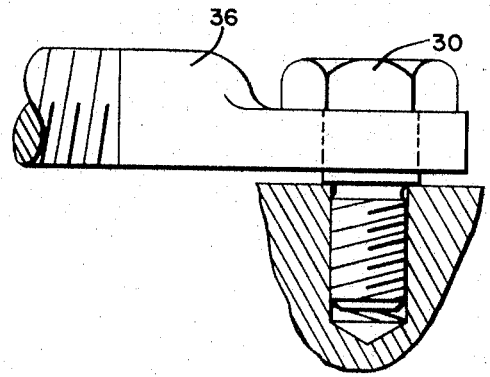

United States Patent Office 3,442,147
Patented May 6, 1969

3,442,147
BELT TENSIONING DEVICE
Wayne Allman Downey, Dubuque, Iowa, assignor to Deere & Company, Moline, Ill., a corporation of Delaware
Filed Nov. 3, 1967, Ser. No. 680,493
Int. Cl. F16h 7/12
U.S. Cl. 74—242.11
7 Claims

ABSTRACT OF THE DISCLOSURE

A device for maintaining uniform tension in a belt, being actuated by a spiral spring, and acting essentially as a turnbuckle in applying a constant pressure against a movable pulley, the pressure on the pulley forcing it outwardly against the belt so as to continuously provide the desired belt tension.

Background of the invention

This invention relates to the automatic tensioning of endless flexible power transmitting elements such as belts, for example, and more particularly to the maintenance of exact and uniform belt tension. The invention finds particular utility in machines such as tractors or automobiles wherein a fan and an electrical generating device such as an alternator or generator are driven from the engine by means of a single belt.

The tightening and adjustment of endless flexible driving means, such as belts, has long been a problem, various devices being used for this purpose including, for example, a turnbuckle in combination with a movable pulley. In addition to such manual devices, a variety of automatic belt tighteners have been used, many of them employing a spring means in combination with a movable pulley. One such device is disclosed in the U.S. patent to Laymon 2,395,332 wherein a turnbuckle is urged by a coil spring to extend itself and thereby exert a force on a movable pulley while a ratchet arrangement prevents any contraction of the turnbuckle. A slightly different approach to the problem is disclosed in the U.S. patent to Pierce 1,232,391 wherein a spiral spring is used in combination with a pulley having an eccentric hub, the spring tending to rotate the hub against the pressure of the belt, and the hub's eccentricity causing a tightening of the belt.

These automatic belt-tensioning devices have been intended to ensure continuous correct belt tension and thereby minimize belt and pulley wear, improve the quality of power transmission, and eliminate the need for frequent inspection and adjustment or maintenance of belts and pulleys. While some of these devices have been at least partially successful, none has been entirely satisfactory. The present invention not only automatically ensures the desired constant belt tension, automatically compensating for belt stretch and belt and pulley wear, but also eliminates belt whip and assures particularly uniform power transmission.

Summary of the invention

The invention resides in an automatic tensioning device for use in conjunction with an endless flexible power-transmitting element such as, for example, a belt and comprising a turnbuckle with a retained spiral spring mounted thereon so that the spring urges the arbor portion of the turnbuckle to rotate, thereby causing an extension of the turnbuckle. One end of the turnbuckle is pivotally mounted at some fixed point, while the other end is pivotally mounted on a movable pulley. The movable pulley and spring-actuated turnbuckle are located in relation to each other so that an extension of the turnbuckle causes an outward movement of the pulley against the power-transmitting element riding therein tending to tighten it. Tension in the power-transmitting element may also be relaxed by a contraction of the turnbuckle against the force of the spiral spring, and tension is thereby constantly maintained at a relatively exact value determined by the adjustment of the spring force.

This belt-tensioning device is easily adjusted to automatically maintain any desired belt tension, and may be easily readjusted whenever a new belt tension is desired. By automatically maintaining proper belt tension, this device substantially eliminates belt slip and, thereby, reduces belt and pulley wear. Over-tightening of the belt is also eliminated and consequent damage to the belt avoided. The device automatically compensates for belt stretch and belt and pulley wear, eliminating the necessity of periodic checks and frequent servicing and adjustment. It also eliminates belt whip and assures uniform power transmission.

Brief description of the drawings

FIG. 3 is the tensioning device viewed along line 3—3 in FIG. 1.

FIG. 4 is an enlarged section along line 4—4 in FIG. 1.

FIG. 5 is an enlarged view of an end portion of the tensioning device as seen along line 5—5 in FIG. 1 showing its mounting on the engine.

Description of the preferred embodiment

Figures 1, 2:
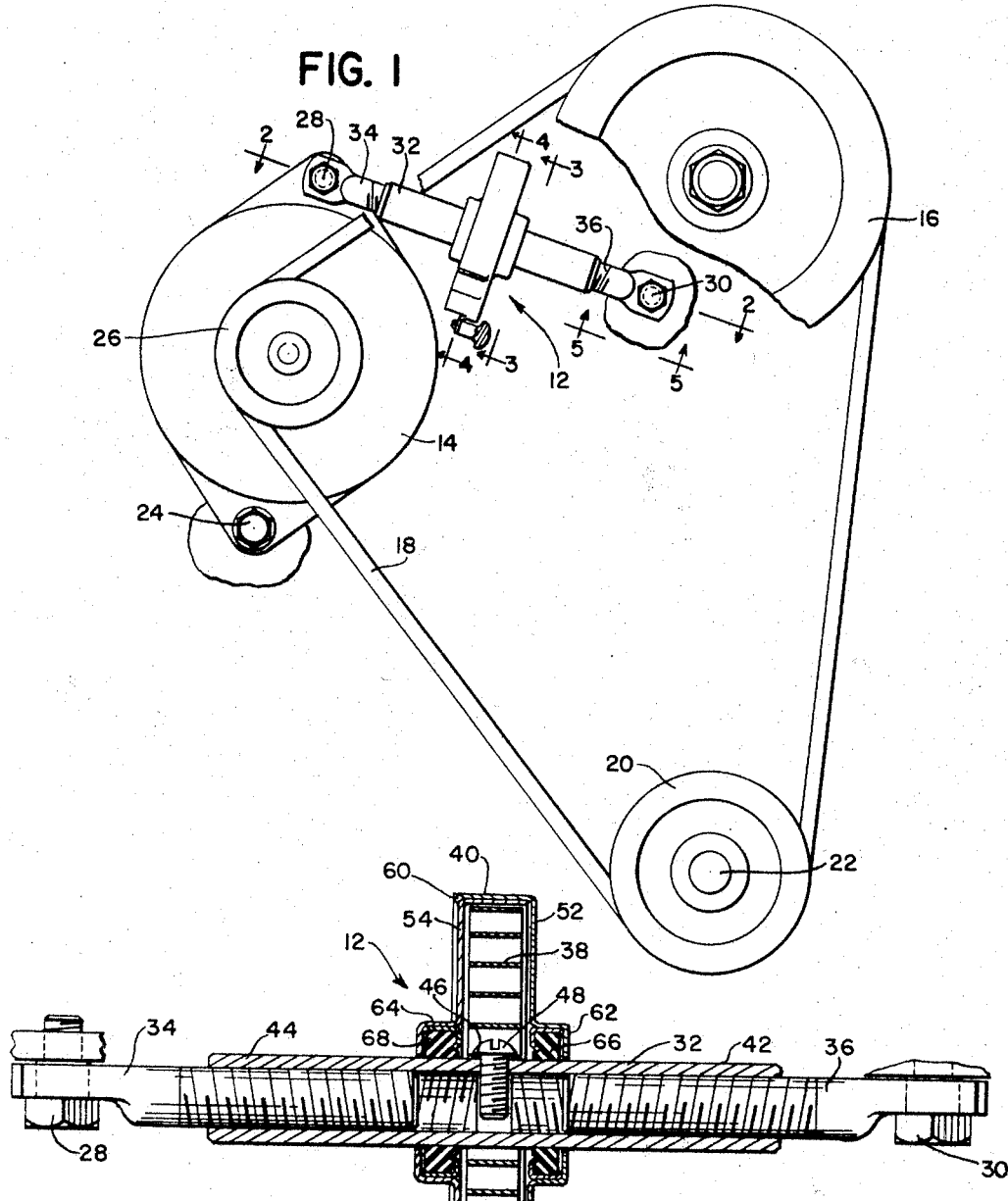
FIG. 1 is a front view of the tensioning device in conjunction with a fan and an alternator driven by a standard V-belt from a conventional tractor engine.
FIG. 2 is an enlarged front sectional view of the tensioning device.

The tensioning device is indicated in its entirety by the numeral 12 and is shown in FIG. 1 in conjunction with an alternator 14 and a fan pulley 16, both of which are driven by a standard V-belt 18 from a pulley 20 attached to the end of the crankshaft 22 of a conventional tractor engine. The alternator 14 is pivotally mounted on the engine at a point indicated by the numeral 24 in FIG. 1, and movement of the alternator about this pivot point will cause the alternator pulley 26 to move along the path indicated. Since the fan and crankshaft pulleys 16 and 20 respectively are fixed, it is apparent that belt tension is solely a function of the force with which the alternator pulley 26 is thrust against the belt 18; and this, in turn, clearly depends entirely upon the external torque applied to the alternator 14.

This external torque is applied to the alternator 14 by the tensioning device 12, one end of which is pivotally mounted on the alternator by a shoulder screw 28 so that a substantial mechanical advantage is realized in forcing the alternator pulley 26 outwardly against the belt 18. The other end of the tensioning device 12 is pivotally mounted at a fixed point on the engine by a shoulder screw 30 as shown in FIG. 5. It should be noted that the tensioning device 12 is located so that when the alternator 14 is, as in FIG. 1, in its normal operating position, the force applied by the tensioning device acts in a direction approximately perpendicular to a line extending from the alternator pivot 24 through the axial center of the alternator pulley 26. In addition, the alternator 14 is located so that in its normal operating position, the resultant force of the belt against the alternator pulley acts in a direction approximately perpendicular to this same line. This approximate geometric arrangement is the most efficient attainable; and belt tensioning is, therefore, accomplished with a minimum of force applied by the tensioning device 12.

The belt tensioning device 12 is comprised of an arbor 32, right and left pivot links 34 and 36 respectively, a spiral spring 38, and a spring retainer 40. The arbor 32 has right- and left-hand portions 42 and 44 respectively, both of which are threaded, the right-hand portion 42 with left-hand threads and the left-hand portion 44 with right-hand threads. Pivot links 34 and 36 are threaded to screw into end portions 42 and 44 respectively of the arbor 32, with the result that rotation of the arbor causes the pivot links, which are restrained against rotation, to move simultaneuosly within the arbor, the distance between the links increasing or decreasing, depending on the direction of arbor rotation, and the overall length of the tensioning device being, thereby, increased or decreased accordingly.

Rotation of the arbor 32, and hence the movement of links 34 and 36, is automatically controlled by the tension in the spiral spring 38, the inner end 46 of which is fastened to the outside of the arbor at a point midway between its ends by a cap screw 48. The spring 38 is contained in the spring retainer 40, and its outer end 50 is bent to a slight offset and held securely between right and left spring-retainer halves 52 and 54 respectively, fitting through a slot 56 in the outer edge of the inside half 54 and into a recess 58 in the outer edge of the outer half 52 as best seen in FIG. 4. The spring retainer 40, whose halves 52 and 54 are staked together at a number of points 60 about its circumference, is rotatably carried by the arbor 32, and has hub portions 62 and 64 which contain seals 66 and 68 respectively. These seals 66 and 68 act as bearing surfaces between the arbor 32 and the spring retainer 40, and serve also to prevent foreign matter from entering the spring retainer. The spring retainer 40 also has a drilled tab 70 radially extending from its circumference which is adapted to be anchored on the engine. Since the spiral spring 38 has one end 46 attached to the arbor 32 and the other end 50 attached to the spring retainer 40, tension in the spring is solely a function of the relative rotational positions of the arbor and the spring retainer. The spring 38 will exert a torque on the arbor 32 which is directly proportional to this spring tension; and since the spring retainer is anchored against rotation, this torque will have a continuing tendency to rotate the arbor, causing links 34 and 36 to be biased apart with a constant force proportional to the tension in the spring.

Thus, belt tension is controlled by the setting of the spring retainer 40. The spring retainer 40 is rotated about the arbor 32 against the force of the spring 38 so as to increase the spring tension to the desired value, and then anchored to the engine by means of the tab 70. The spring tension is thus fixed at a constant value; and the spring consequently exerts a constant torque on the arbor 32, thereby causing the pivot links 34 and 36 to be biased apart with a constant force. This constant force is transmitted to the alternator 14 through the shoulder screw 28 and results in a constant torque applied to the alternator tending to pivot it about its mounting point 24. The alternator pulley is thus forced outwardly against the belt 18 with a constant force, and a constant belt tension results.

The tensioning device 12 automatically maintains this constant belt tension, expanding to compensate for belt stretch or belt and pulley wear and contracting when necessary to avoid over-tightening. It will be seen that this expansion or contraction of the tensioning device 12 will have some small effect on the relative rotational positions of the arbor 32 and spring retainer 40 and hence on the tension in the spring 38. This change in spring tension, however, is so slight as to have no appreciable effect on the belt tension. Hence, although the belt tension can be easily increased or decreased by resetting the adjustment of the spring retainer, a constant belt tension will otherwise prevail.

As a variation of the design heretofore described, the turnbuckle might be provided with only one threaded link, the other link being rotatably mounted on the arbor as a swivel or on bearings, for example, thereby eliminating nearly 50% of the friction inherent in two threaded connections. This and other similar variations in the device disclosed are deemed to be included within the present invention.

I claim:
1. A device to be used in conjunction with a movable rotatable member for the tensioning of endless flexible power-transmission elements, comprising: turnbuckle means acting between said member and a support; spring means mounted on said turnbuckle means so as to exert an external torque thereon; and means for adjusting and maintaining the tension in said spring means.

2. The invention defined in claim 1 wherein the turnbuckle means is comprised of an arbor having opposite end portions which are threaded in opposite axial directions, and two threaded link members adapted to screw into said opposite end portions of the arbor, one of said link members being pivotally attached at one of its ends to said movable rotatable member, and the other of said link members being pivotally attached at one of its ends to the support.

3. The invention defined in claim 2 wherein said spring means is rigidly attached to the outside of said arbor.

4. The invention defined in claim 3 wherein the spring means is a spiral spring, the inner end of which is attached to the arbor.

5. The invention defined in claim 4 including a spring-retaining member which substantially covers said spring and to which the outer end of said spring is rigidly attached, said spring-retaining member being rotatable about said arbor.

6. The invention defined in claim 5 wherein means are provided for releasably anchoring said spring retainer to the support to prevent its rotation about said arbor.

7. A belt-tensioning device comprising: an arbor having opposite end portions threaded in opposite axial directions; two threaded link members adapted to screw into said opposite end portions of said arbor; a spiral spring having its inside end portion rigidly attached to the outside of said arbor; a spring-retaining member substantially covering said spring and rigidly attached to its outer end portion and being centered on and rotatable about said arbor; and a means for releasably anchoring said spring retainer against rotation about said arbor.

References Cited

UNITED STATES PATENTS

| | | | |
|---|---|---|---|
| 403,048 | 5/1889 | Jones | 74—242.11. |
| 447,301 | 3/1891 | Dootson | 74—242.11 XR |
| 1,809,435 | 6/1931 | Wood | 74—242.11 |
| 2,066,721 | 1/1937 | Eaton | 74—242.11 XR |
| 2,395,332 | 2/1946 | Laymon | 74—242.11 |

MILTON KAUFMAN, *Primary Examiner.*

J. A. WONG, *Assistant Examiner.*

U.S. Cl. X.R.

74—242.15